(12) United States Patent
Olsen et al.

(10) Patent No.: US 8,316,886 B2
(45) Date of Patent: Nov. 27, 2012

(54) NEAR BOILER PIPING APPARATUS WITH OPEN DRAIN

(75) Inventors: Jason Lars Olsen, Wellesley, MA (US); Michael Reck, Worcester, MA (US)

(73) Assignee: Webstone Company, Inc., Worcester, MA (US)

( * ) Notice: Subject to any disclaimer, the term of this patent is extended or adjusted under 35 U.S.C. 154(b) by 0 days.

(21) Appl. No.: 12/836,335

(22) Filed: Jul. 14, 2010

(65) Prior Publication Data

US 2010/0319795 A1   Dec. 23, 2010

Related U.S. Application Data

(63) Continuation of application No. 12/836,248, filed on Jul. 14, 2010, which is a continuation-in-part of application No. 12/753,408, filed on Apr. 2, 2010, which is a continuation-in-part of application No. 12/615,547, filed on Nov. 10, 2009, which is a continuation-in-part of application No. 11/929,002, filed on Oct. 30, 2007, which is a continuation-in-part of application No. 11/648,376, filed on Dec. 29, 2006, now abandoned.

(60) Provisional application No. 60/756,007, filed on Jan. 4, 2006.

(51) Int. Cl.
   *F16K 11/20* (2006.01)

(52) U.S. Cl. ............. 137/597; 137/599.14; 137/601.16; 137/876; 137/887; 137/613

(58) Field of Classification Search ............... 137/597, 137/599.11, 599.14, 601.16, 872, 876, 883, 137/887, 613
See application file for complete search history.

(56) References Cited

U.S. PATENT DOCUMENTS

| | | | |
|---|---|---|---|
| 1,350,362 | A | 8/1920 | Decker |
| 2,169,043 | A | 8/1939 | Goehring |
| 2,441,483 | A | 5/1948 | Goehring |
| 2,835,234 | A | 5/1958 | Rasch et al. |
| 3,460,566 | A | 8/1969 | Heartstedt et al. |
| 3,473,554 | A | 10/1969 | King |
| 3,591,131 | A | 7/1971 | Carlson |
| 3,627,203 | A | 12/1971 | Martin |
| 3,674,052 | A | 7/1972 | Hartman et al. |
| 3,770,016 | A | 11/1973 | Johnstone et al. |
| 4,089,345 | A | 5/1978 | Eberhardt |
| 4,103,868 | A | 8/1978 | Thompson |
| 4,206,904 | A | 6/1980 | Dante |
| 4,291,689 | A | 9/1981 | Hay |
| 4,342,444 | A | 8/1982 | Sonderman |

(Continued)

FOREIGN PATENT DOCUMENTS

WO   2005031200 A1   4/2005

*Primary Examiner* — William McCalister
(74) *Attorney, Agent, or Firm* — Mark S. Leonardo; Brown Rudnick LLP

(57) ABSTRACT

A near-boiler piping loop apparatus is provided including a primary/secondary piping loop interface apparatus having a unitary construction including a secondary loop shut-off valve, drain valve and drain port in each branch of a secondary loop for connection to a boiler. Supply branch piping and return branch piping connects the interface apparatus to the boiler and provides attachment points for auxiliary plumbing equipment. The apparatus is adapted to connect to pump in variable orientations using rotatable flanges on the interface apparatus and on a wye strainer in the secondary loop supply branch and includes a union fitting attached to the interface apparatus. The union fitting provides a mounting hole for a temperature or pressure gauge.

9 Claims, 22 Drawing Sheets

U.S. PATENT DOCUMENTS

| | | |
|---|---|---|
| 4,479,459 A | 10/1984 | Piper |
| 4,711,268 A | 12/1987 | Coleman |
| 4,718,444 A | 1/1988 | Boelte |
| 4,879,912 A | 11/1989 | Suckow |
| 5,152,502 A | 10/1992 | Randall et al. |
| 5,551,479 A | 9/1996 | Graves |
| 5,586,449 A | 12/1996 | Krist |
| 5,632,300 A | 5/1997 | Isringhausen |
| 5,762,100 A * | 6/1998 | Wilda et al. .................. 137/341 |
| 5,857,717 A | 1/1999 | Caffrey |
| 6,296,229 B1 | 10/2001 | Giacomini |
| 6,347,644 B1 | 2/2002 | Channell |
| 6,357,477 B1 | 3/2002 | Walcott et al. |
| 6,655,412 B2 * | 12/2003 | Reck ............................ 137/883 |
| 2007/0169827 A1 | 7/2007 | Reck |
| 2007/0181194 A1 | 8/2007 | Honzelka et al. |
| 2008/0087340 A1 | 4/2008 | Reck |
| 2008/0142104 A1 | 6/2008 | Reck |

* cited by examiner

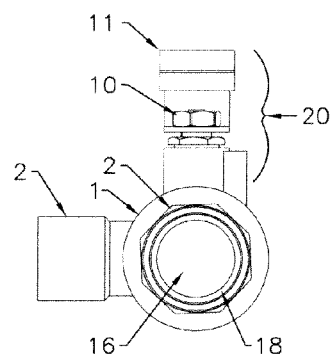
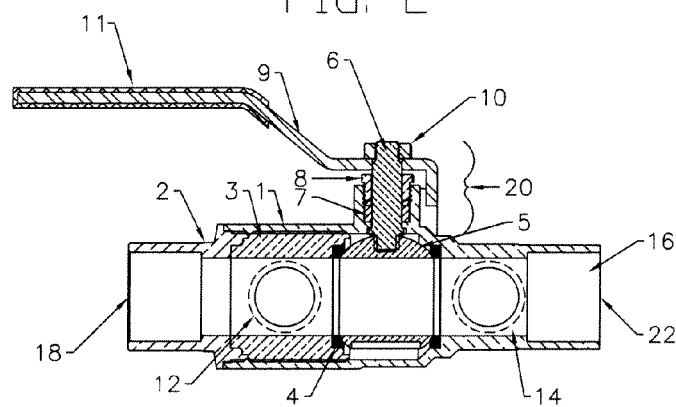
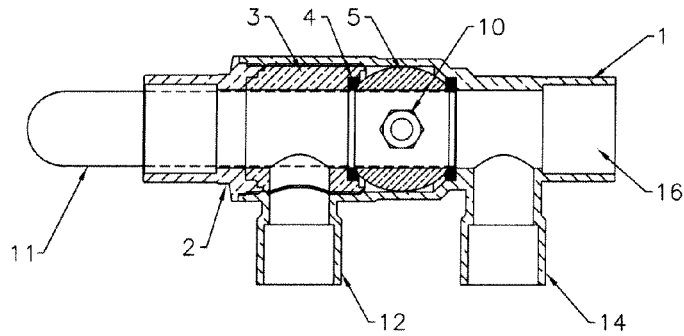

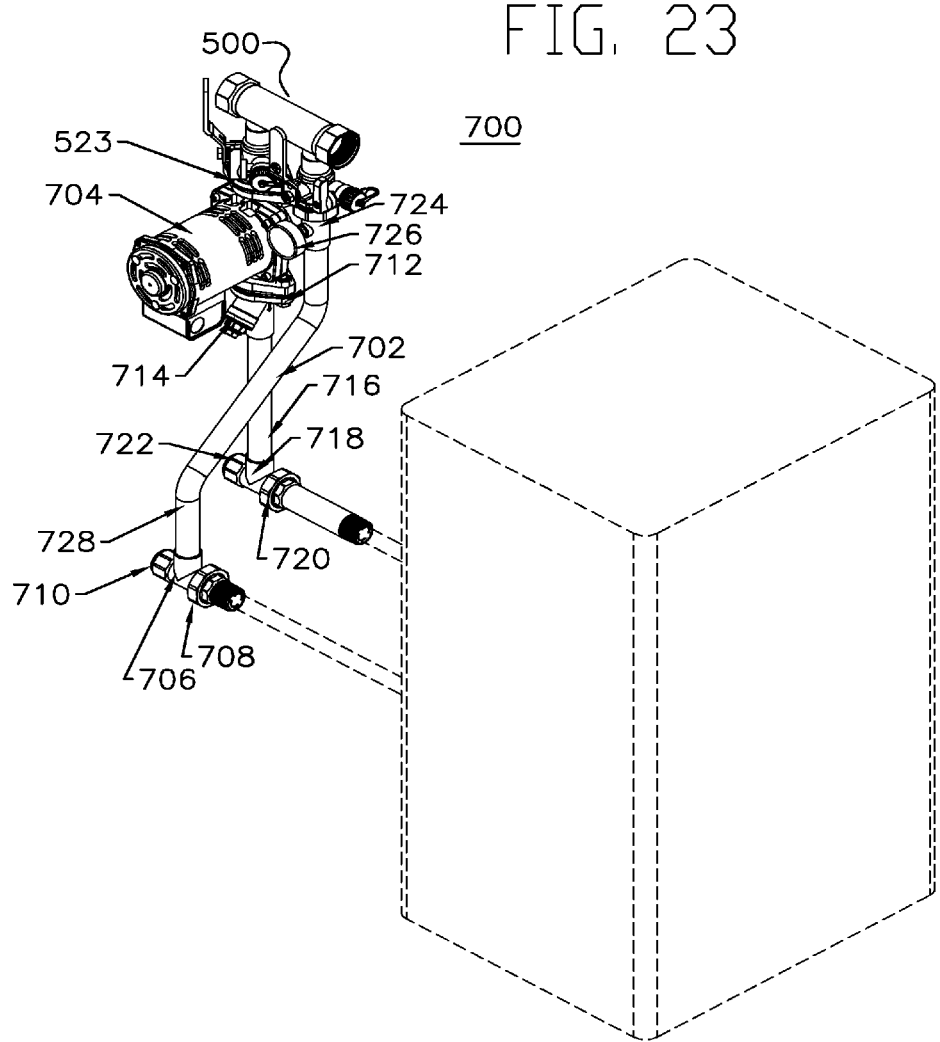

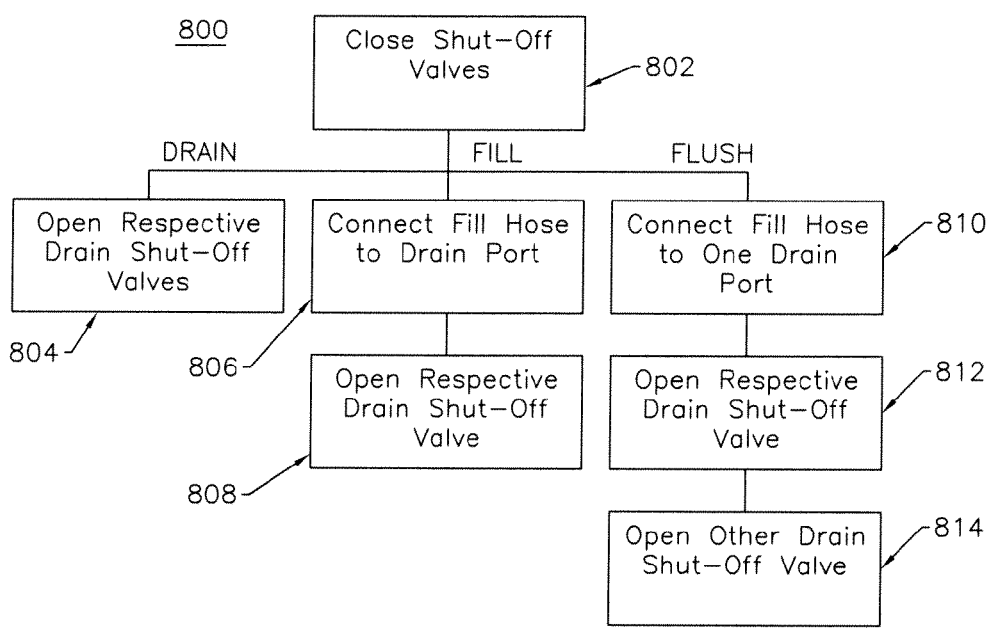

NEAR BOILER PIPING APPARATUS WITH OPEN DRAIN

CROSS REFERENCE TO RELATED APPLICATIONS

This is a continuation of U.S. patent application Ser. No. 12/836,248 which is a continuation-in-part (CIP) of U.S. patent application Ser. No. 12/753,408 filed on Apr. 2, 2010 which is a continuation-in-part (CIP) of U.S. patent application Ser. No. 12/615,547 filed on Nov. 10, 2009 which is a CIP of U.S. patent application Ser. No. 11/929,002 filed on Oct. 30, 2007 which is a CIP of U.S. patent application Ser. No. 11/648,376 filed on Dec. 29, 2006 which claims the benefit of U.S. Provisional Patent Application No. 60/756,007, filed on Jan. 4, 2006. The contents of U.S. patent application Ser. No. 12/753,408, U.S. patent application Ser. No. 12/615,547, U.S. patent application Ser. No. 11/929,002, U.S. patent application Ser. No. 11/648,376 and U.S. Provisional Patent Application No. 60/756,007 are incorporated herein by reference in their entirety.

FIELD OF INVENTION

The present invention relates to primary/secondary loop piping systems and more particularly to a near boiler piping apparatus.

BACKGROUND OF INVENTION

Primary/secondary ("P/S") piping systems are used to isolate the pressure differential established by a pump from those established by other pumps in the same system. P/S piping allows any pump in the system to operate with virtually no tendency to induce flow, or even disturb flow, in other loops. P/S piping systems have become increasingly popular in many commercial and residential plumbing systems, such as hydronic heating and cooling systems. In such systems purge valves are essential to the operation and maintenance of the systems. Hydronic heating systems have gained popularity due to the comfortable average temperature they provide and uniformity in heating. Hydronic systems use water, or water-based solutions, to move thermal energy from where it is produced to where it is needed. Thermal energy is absorbed by the water at a heat source, conveyed by the water through the distribution piping, and finally released into a heated space by a heat emitter. Because hydronic heating and cooling systems rely on the flow of water through the pipes, the presence of air bubbles or pockets within the piping can lead to inefficiency and malfunction of the system. Purge valves are used to empty the system of air upon installation and during maintenance to provide for a more efficient system. Previous systems utilized purge valves located on the secondary loop in order to remove air from the secondary loop. The use of such valves can lead to pressure differentials that can affect the operation of the remainder of the system.

Hydronic systems utilize a liquid fluid to shift energy (i.e. BTUs) from one location to another. Typically this is accomplished by heating up (or in cooling applications, cooling) a liquid, such as water, or a mixture of water and other fluids (such as glycol antifreeze) to elevate the boiling point and lower the freezing point, and pumping the liquid to another location where the captured energy in the fluid is released. The hydronic solution can be heated through the use of a boiler, solar energy, geothermal pump, or any other means. The hydronic solution can be cooled by use of a heat pump, geothermal pump, or other such means of cooling the solution.

Hydronic systems require periodic maintenance, either to replace the water in the system or to replace a mixture of water and antifreeze, to perform de-scaling of the heat exchangers or to flush out sludge, etc. This is accomplished by draining the hydronic system, flushing with a de-scaling and/or cleaning solution, draining and filling the system back up with new fluid. Historically, purging a typical hydronic system has been accomplished by plumbing an assembly consisting of a boiler drain connected to a check valve and connected to another boiler drain. This method, while functional, is far from ideal. There are several connections as part of the assembly which each provide a potential leak path. Further, disadvantageously, the check valve typically does not provide for complete shutoff and during normal operation of the system the check valve offers some internal flow restriction.

SUMMARY OF INVENTION

A P/S loop adapter and valve apparatus that allows for the elimination of air from a piping system with no discernable pressure decrease is disclosed. The adapter allows for power purging off a secondary loop in the installation of hydronic systems. An embodiment of the present invention includes a valve body containing a flow channel extending through the body from a first primary loop port to a second primary loop port. The valve body also contains first and second secondary loop ports in communication with the flow channel. A flow diversion device is disposed in the valve body to control and alter the flow channel through the various ports of the valve body. The flow diversion device is disposed within the flow channel between the first and second secondary loop ports. The flow diversion device in a first position allows open flow through all ports of the valve. In a second position, the flow diversion device directs flow from the first primary loop port to the first secondary loop port and flow from the second secondary loop port to the second primary loop port.

Embodiments of the present invention provide improvements over historical systems and methods for purging hydronic systems by combining un-obstructive flow pattern of a ball valve and positive shutoff characteristics of a ball valve with fewer connection joints of the purge and fill valve assembly to alleviates the detriments such as internal flow restriction, incomplete shutoff and additional leak paths which are prevalent in the current systems and methods.

An illustrative embodiment of the present invention which is useful in purging hydronic systems provides a purge and fill valve which utilizes three ball valves that are combined into one valve assembly. The valve has a main ball and two valves that communicate from the main valve to an external connection (i.e., drain and fill connections). When the main ball is closed, and the two valves for external communication are opened, the hydronic system can be conveniently and completely emptied and filled from one location. New fluid can be introduced and push out the old fluid, all at one time. The system does not need to be fully emptied and then filled; a two stepped process, rather this is all done in one step.

It should be understood that labeling of "primary" flow path and "secondary" flow path is for illustration purposes and can be reversed without changing the scope of the present invention. For example, the primary flow path could be called the secondary flow path and vice versa. In a typical hydronic system, the primary loop is usually, but not always, associated with a boiler. The closely spaced tees hydraulically separates the primary flow path from the secondary flow path. That is, flow in the primary flow path does not affect flow in the secondary flow path and flow in the secondary flow path does not affect flow in the primary flow path.

In a further illustrative embodiment, where in comparison with the previous embodiment, the "primary" loop is now designated as "secondary," a valve body contains a first primary loop port, a second primary loop port, a first secondary loop port and a second secondary loop port. The secondary loop ports are disposed at respective ends of a linear secondary loop portion of the valve body. A primary loop portion of the valve body is formed by a pair of closely spaced tees extending from the secondary loop portion. At least one main valve portion is disposed in at least one of the tees between the secondary loop portion and a primary loop port. A drain/venting valve portion extends from the main valve portion. A portion of the secondary loop portion between the tees is shared with the primary loop portion in which flow in a primary loop and a secondary loop are hydraulically separated.

People having ordinary skill in the art should appreciate that closely spaced tees are fluid flow path configurations in which two branches from a single flow path in a T shaped arrangement are spaced apart from each other such that center lines of each of the branches are less than about four times the diameter of the single flow path from which they stem. People having ordinary skill in the art should also appreciate that using closely spaced tees in a closed loop system creates a hydraulic separation where, due to lack of a pressure drop between the tees, a separate flow path is created or maintained through each of the tees.

Another illustrative embodiment of the invention provides a primary/secondary loop purge valve in which a valve body contains a first purge/fill port, a second purge/fill port, a first primary loop port and a second primary loop port. The primary loop ports are disposed at respective ends of a linear secondary loop portion of the valve body. A first purge/fill valve portion and a second purge/fill valve portion are formed in a pair of closely spaced tees extending from the primary loop portion. A main valve portion is disposed in the primary loop portion in alignment with one of the closely spaced tees.

Yet another illustrative embodiment of the invention provides a primary/secondary loop adapter having at least one main flow diversion device disposed in a respective at least one of a pair of closely spaced tees forming a primary loop portion of the adapter. A secondary loop portion of the adapter is formed by a linear adapter body from which the tees extend. The at least one flow diversion device may include a drain valve portion extending therefrom. One or more primary loop ports of the primary loop portion may include a flange adapted for connection to an apparatus, such as a pump, in the primary loop of a hydronic system.

Another embodiment of the invention provides a near-boiler piping loop apparatus including a primary/secondary piping loop interface apparatus having a unitary construction including a secondary loop shut-off valve, drain valve and drain port in each branch of a secondary loop for connection to a boiler. Supply branch piping and return branch piping connects the interface apparatus to the boiler and provides attachment points for auxiliary plumbing equipment. The apparatus is adapted to connect to pump in variable orientations using rotatable flanges on the interface apparatus and on a wye strainer in the secondary loop supply branch and includes a union fitting attached to the interface apparatus. The union fitting provides a mounting hole for a temperature or pressure gauge.

BRIEF DESCRIPTION OF THE DRAWINGS

The foregoing and other features and advantages of the present invention will be more fully understood from the following detailed description of illustrative embodiments, taken in conjunction with the accompanying drawings in which:

FIG. 1 is an axial view of a first embodiment in accordance with the present invention;

FIG. 2 is a cut-away side view of the first embodiment in accordance with the present invention;

FIG. 3 is a top-down cut-away view of the first embodiment in accordance with the present invention;

FIG. 23 is a plan view of a near boiler piping apparatus according to an illustrative embodiment of the invention; and FIG. 24 is a process flow diagram showing a method for operating a primary/secondary loop interface apparatus to drain, fill or flush a secondary loop of a primary/secondary loop piping system according to an illustrative embodiment of the invention.

DETAILED DESCRIPTION

Figure 4:
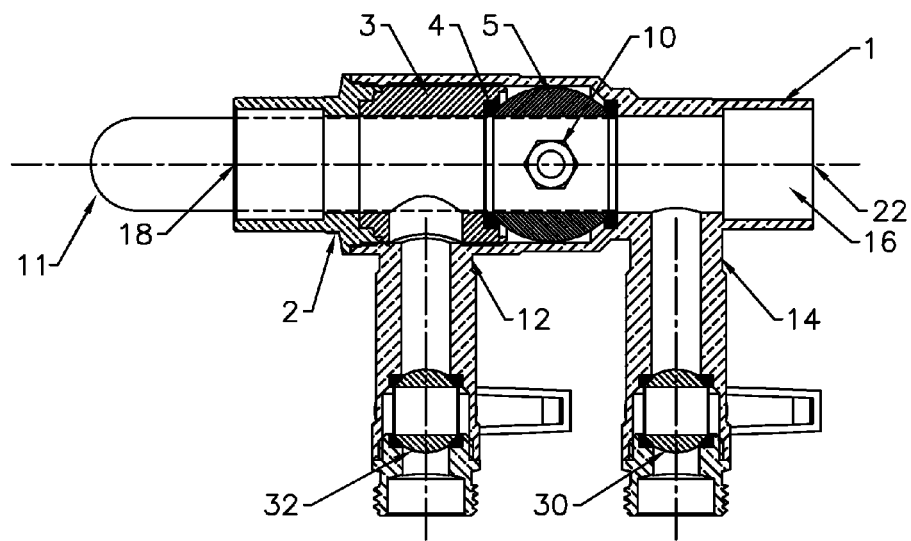
FIG. 4 is a top-down cut-away view of a second embodiment having a flow diversion device disposed within the first and second secondary loop ports.

Detailed embodiments of the present invention are disclosed herein, however, it is to be understood that the disclosed embodiments are merely exemplary of the invention, which may be embodied in various forms. Therefore, specific functional or structural details disclosed herein are not to be interpreted as limiting, but merely as a basis for the claims and as a representative basis for teaching one skilled in the art to variously employ the present invention in virtually any appropriately detailed embodiment.

Turning to FIG. 1, an axial view of an embodiment in accordance with the present invention is shown. A valve body 1 defines a flow channel 16 that extends axially through the valve body 1 from a first primary loop port 18 to a second primary loop port. The valve body 1 also defines a first secondary loop port 12 and a second secondary loop port (not shown). An end cap 2 is affixed to the valve body 1 at the first primary loop port 18. An actuator 20 extends from the valve body 1 enabling a first and second position of the valve. The actuator 20 includes a handle 11 affixed to the valve body by a handle nut 10. A flow diversion device (not shown here) is connected to the handle 11. The position of the actuator 20 in a first position configures the flow diversion device to allow flow axially through the entire flow channel 16 from the first primary loop port to the second primary loop flow port as well as through the first and second secondary loop flow ports. In a second position of the actuator 20, the flow diversion device blocks the flow from the first primary loop port 18 to the second primary loop port. In this position, the first primary loop port 18 is in fluid communication with the first secondary loop port 12 only and the second primary loop port is in fluid communication with the second secondary loop port only. In a hydronic piping system, the valve in this position will break the primary loop and force all flow into the secondary loop. This position is used in such systems to purge the secondary loop of air during installation or maintenance.

Turning now to FIG. 2 and FIG. 3, cut-away views of the first embodiment of the present invention are shown. FIG. 2 depicts the embodiment from a side-view, while FIG. 3 depicts the embodiment from a top-view. A valve body 1 defines a flow channel 16 axially though the valve from the first primary loop port 18 to the second primary loop port 22. The first secondary loop port 12 and the second secondary loop port 14 are also in fluid communication with the flow channel 16. The end cap 2 is disposed into the valve body 1 and mated with a seat retainer 3. The actuator 20 extends from the valve body 1 containing a stem 6, a stem seal 7 and a packing gland 8. The actuator 20 also includes a handle 11 that is affixed to the stem 6 with the handle nut 10. The actuator 20 repositions the flow diversion device 5 to alter the flow channels of the valve. The flow diversion device 5 is disposed within the valve body 1 in between the first secondary loop port 12 and the second secondary loop port 14. The flow diversion device in this embodiment includes a ball defining two openings equal in diameter to the diameter of the flow channel 16. The flow diversion device 5 is disposed between valve seats 4. The position of the actuator 20 in a first position positions the flow diversion device to allow flow axially through the entire flow channel 16 from the first primary loop port to the second primary loop port as well as through the first and second secondary loop ports. In a second position of the actuator 20, the flow diversion device blocks the flow from the first primary port 18 to the second primary port. In this position, the first primary loop port 18 is in fluid communication with the first secondary loop port 12 only and the second primary loop port is in fluid communication with the second secondary loop port only.

An alternative embodiment of the present invention is described with reference to FIG. 4 which is similar to the embodiment shown in FIG. 3 but also includes a flow diversion device disposed within each of the first and second secondary loop ports 12, 14. A valve body 1 defines a flow channel 16 axially though the valve from the first primary loop port 18 to the second primary loop port 22. The first secondary loop port 12 and the second secondary loop port 14 are also in fluid communication with the flow channel 16. A first secondary flow diversion device 30 is disposed within the first secondary loop port and is configurable to a first position which closes the first secondary loop port and to a second position which opens the first secondary loop port. A second secondary flow diversion device 32 is disposed within the second secondary loop port and is configurable to a first position which closes the second secondary loop port and to a second position which opens the second secondary loop port.

Figure 5:
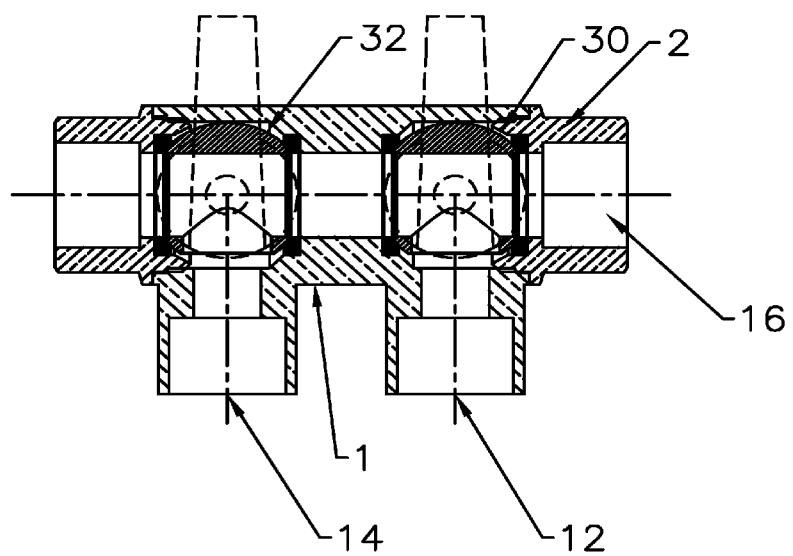
FIG. 5 is a top-down cut-away view of a third embodiment having multiple flow diversion devices disposed within the primary loop.

In a still further alternative embodiment illustrated in FIG. 5 the primary/secondary loop valve includes multiple valves in the primary loop to effect flow in the primary and secondary loops. The multiple flow diversion devices, 30, 32 are disposed in the primary flow channel 16 at the intersections of the primary and secondary flow paths. The flow diversion devices are configured, as described hereinbefore, to alternately provide flow through at least one of the primary and secondary loops.

The present invention also provides a method of purging a primary loop in a primary/secondary plumbing system using the inventive loop purge valve by connecting the first secondary loop port to a flushing fluid source and actuating the primary flow diversion device to configure the primary flow diversion device in its second position to close the flow path between the first primary loop port and second primary loop port. The first secondary flow diversion device is configured in the second position to allow the flushing fluid to flow into the first secondary loop port and the second secondary flow diversion device is configured in the second position to allow the flushing fluid to flow out from the second secondary loop port after flowing through the secondary loop (complete loop not shown). Upon completion of the purging procedure, each of the flow diversion devices can be configured to their respective first positions.

Although one illustrative embodiment described herein includes diversion devices in both of the secondary loop ports and in the primary loop path, one skilled in the art should appreciate that other configurations of diversion devices can be implemented, such as a diversion device in each of the first and second primary loop ports, or in other combinations, such as a diversion device at inputs and/or outputs of the loop ports (primary and/or secondary).

Figure 6:
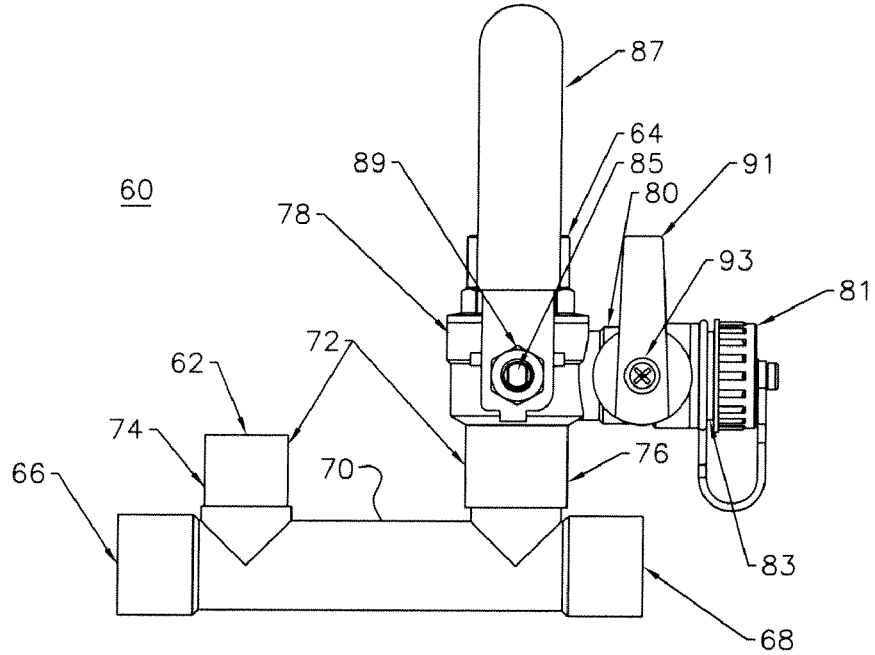
FIG. 6 is a plan view of a primary/secondary loop purge valve in normal operating position according to a fourth illustrative embodiment of the invention.

FIG. 6 is a plan view of a primary/secondary loop purge valve in normal operating position according to a fourth illustrative embodiment of the invention. The embodiment includes a valve body 60 containing a first primary loop port 62, a second primary loop port 64, a first secondary loop port 66 and a second secondary loop port 68. The secondary loop ports 66, 68 are disposed at respective ends of a linear secondary loop portion 70 of the valve body 60. A primary loop portion 72 of the valve body 60 is formed by a pair of "closely" spaced tees 74, 76 extending from the secondary loop portion 70. At least one main valve portion 78 is disposed in at least one of the tees 76 between the secondary loop portion 70 and a primary loop port 64. A drain/venting valve portion 80 extends from the main valve portion 78. An end cap 81 is affixed to the valve body 60 at a drain port 83 of the drain/venting valve portion 80. A portion of the secondary loop portion 70 between the tees 74, 76 is shared with the primary loop portion in which flow in a primary loop and a secondary loop are "hydraulically separated."

A main actuator 85 extends from the valve body 60 enabling a first and second position of the main valve portion 78. A main flow diversion device (not shown here) is connected to a main handle 87 via the main actuator 85. The main handle 87 is retained to the main actuator with a nut 89. A purge valve handle 91 is connected to a purge valve flow diversion device (not shown here) via a purge valve actuator (not shown here). The purge valve handle 91 is retained to the purge valve actuator by a screw 93.

Figure 7:
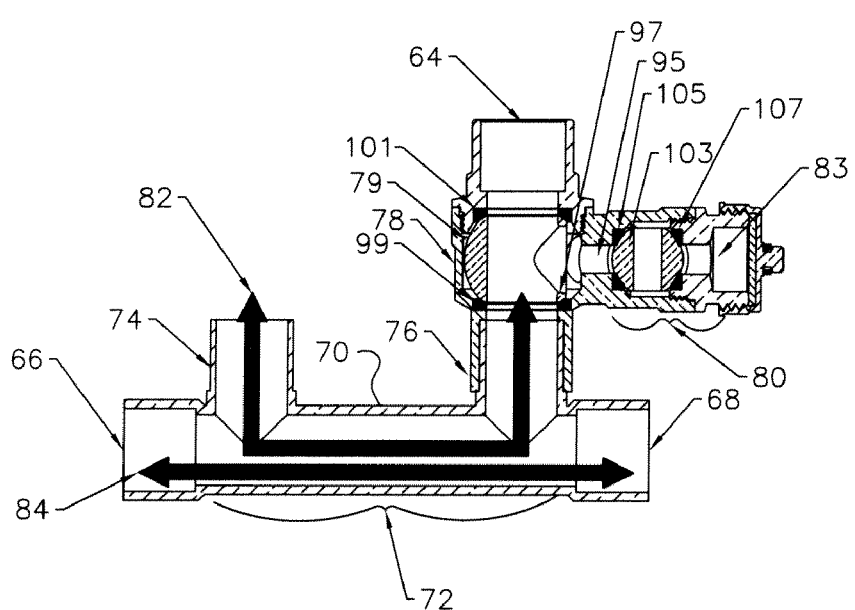
FIG. 7 is a section view of the primary/secondary loop purge valve in normal operating position according to the fourth illustrative embodiment of the invention.

FIG. 7 is a sectioned view of the primary/secondary loop purge valve in normal operating position according to the fourth illustrative embodiment of the invention. A primary loop fluid flow path 82 is shown by arrows extending into tee 74, through the secondary loop portion 70 and into tee 76. Fluid can flow in either direction along the primary loop fluid flow path 82. A secondary loop flow path 84 is shown by arrows extending into the first secondary loop port 66 through the secondary loop portion 70 and out from the second secondary loop port 68. It should be understood that a common flow of both the primary loop flow path 82 and the secondary loop flow path 84 exists in the secondary loop portion 70.

The main valve portion 78 is shown in the normal operation position in which fluid in the primary fluid flow path 82 can flow from secondary loop portion 70 through the main valve portion 78 to the primary loop port 64. The main flow diversion device 79 in the main valve portion 78 is shown in a first position to enable flow in the primary flow path between tee 76 and the second primary loop port 64 while preventing flow to the drain/venting valve portion 80. In this illustrative embodiment, the main flow diversion device 79 is a first ball having a through hole 95 extending through its center and a blind hole 97 extending orthogonal to the through hole to its center. The first ball is rotatable on an axis of the main actuator 85 (FIG. 7) by movement of handle 87 (best seen in FIG. 6) and main actuator 85 (FIG. 7). The first ball forms a seal with sealing portions 99 and 101.

The purge valve flow diversion device 103 in the drain/venting valve portion 80 is shown in its normally closed position in which fluid in the primary flow path 82 is prevented from flowing between the main valve portion 78 and the drain port 83. In this illustrative embodiment, the purge valve flow diversion device 103 is a second ball having a through hole extending through its center. The second ball is rotatable on an axis of the purge valve actuator (not shown) which extends through its center and normal to the plane of drawing in FIG. 7 by movement of purge valve handle 91 (best seen in FIG. 6) and the purge valve actuator retained thereto (not shown) by screw 93. The second ball forms a seal with sealing portions 105 and 107.

Figure 8:
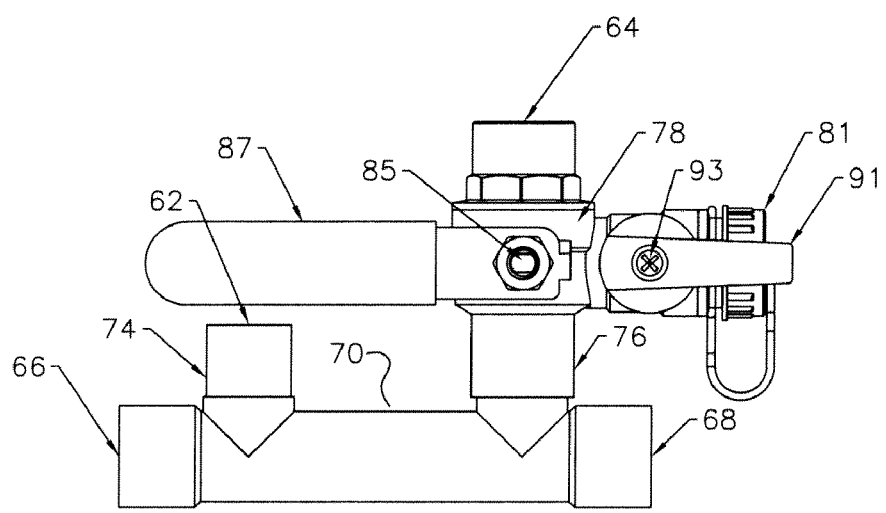
FIG. 8 is a plan view of the primary/secondary loop purge valve in a purging position according to the fourth illustrative embodiment of the invention.

FIG. 8 is a plan view of the primary/secondary loop purge valve in a purge/drain position according to the fourth illustrative embodiment of the invention. The main valve handle 87 and main actuator 85 are rotated 90 degrees counter clockwise relative to their normal operating position. The purge valve handle 91 is rotated 90 degrees clockwise relative to its normally closed position.

Figure 9:
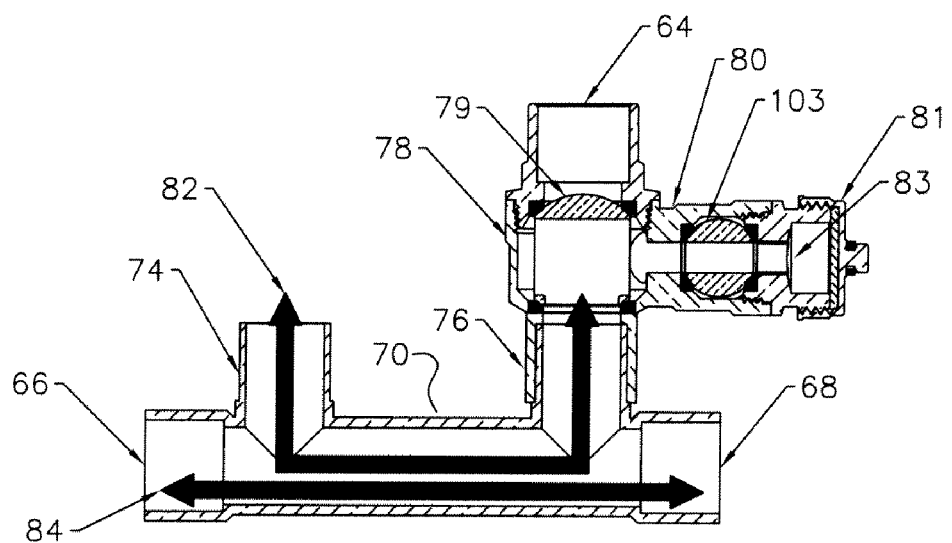
FIG. 9 is a section view of the primary/secondary loop purge valve in purging position according to the fourth illustrative embodiment of the invention.

FIG. 9 is a section view of the primary/secondary loop purge valve in a purge/drain position according to the fourth illustrative embodiment of the invention. The primary loop fluid flow path 82 is shown by arrows extending into tee 74, through the secondary loop portion 70 and into tee 76. Fluid in the primary flow path flows into main valve portion 78 where it is diverted by the main flow diversion device 79 into the drain/venting valve portion 80. Because the purge valve handle is in the purge/drain position, fluid entering the drain/venting valve portion 80 can flow through the purge valve flow diversion device 103 to the drain port 83. Protective cap 81 can be removed to vent or drain the system via the primary flow path 82.

Again, it should be understood that labeling of "primary" flow path and "secondary" flow path is for illustration purposes and can be reversed without changing the scope of the present invention. For example, the primary flow path could be called the secondary flow path and vice versa. In a typical hydronic system, the primary loop is usually, but not always, associated with a boiler. The closely spaced tees hydraulically separates the primary flow path from the secondary flow path. That is, flow in the primary flow path does not affect flow in the secondary flow path and flow in the secondary flow path does not affect flow in the primary flow path.

In normal operating position of valve body 60, the affect of closely spaced tees 74,76 and main valve portion 78 in the normal operating position is to hydraulically separate the primary flow path 82 from the secondary flow path 84.

In a second configuration, the main valve portion 78 closes off the primary flow path 82 and the drain/venting valve portion 80 is opened. The flow from the primary flow path 82 goes into a flow passageway, secondary loop portion 70, that is shared with the secondary flow path 84, then back to the primary flow path 82. Because the main valve portion is "closed", i.e. in its second configuration, and the drain/venting valve portion 80 is open, for example any trapped air is purged out of the system. Once the trapped air has been purged out of the system, the main valve portion 78 and the drain/venting valve portion 80 are returned to their normal operating positions.

Hydronic systems that use the primary/secondary piping method typically have circulation pumps installed in each loop. The circulation pump forces the fluid through the loop until the fluid encounters an obstacle, such as a shut valve. By providing a new path for the fluid to flow (e.g., out of the drain/venting valve portion 80) the fluid can continue to flow. Upon commissioning a piping system, or performing maintenance on a system, air is tapped inside the piping system. By power pumping when the main valve portion 78 and drain venting valve portion 80 are in the drain/purge configuration, air is power purged from the system via the drain port 83.

It should be appreciated that the flow directions in the primary flow path 82 and the secondary flow path 84 can be reversed within the scope of the present invention. In such cases, the main flow diversion device 79 is oriented 180 degrees relative to the orientation shown so that the closed portion is located downstream, i.e. toward the lower portion of main valve portion 79 when the primary flow path is oriented from the second primary loop port 64 toward tee 76.

Figure 10:
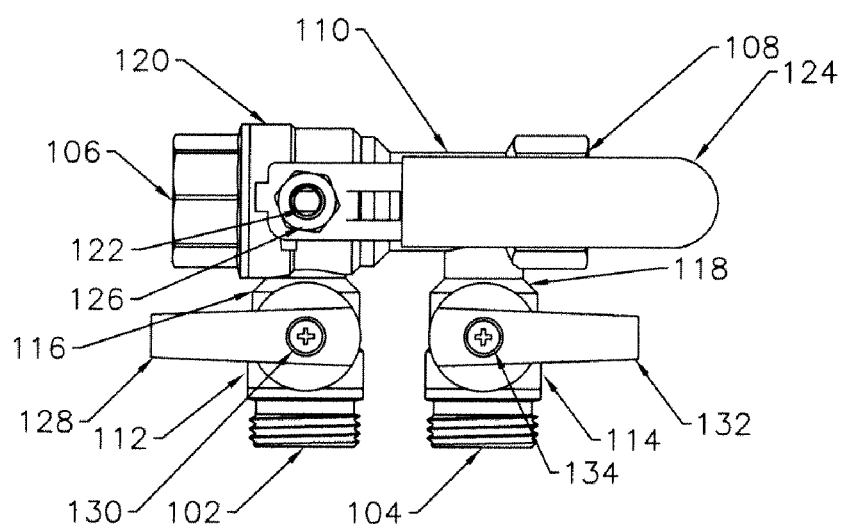
FIG. 10 is a plan view of a primary/secondary loop purge valve in normal operating position according to a fifth illustrative embodiment of the invention.

FIG. 10 is a plan view of a primary/secondary loop purge valve in normal operating position according to a fifth illustrative embodiment of the invention. The embodiment includes a valve body 100 containing a first purge/fill port 102, a second purge/fill port 104, a first primary loop port 106 and a second primary loop port 108. The primary loop ports 106, 108 are disposed at respective ends of a linear primary loop portion 110 of the valve body 100. A first purge/fill valve portion 112 and a second purge/fill valve portion 114 are formed in a pair of closely spaced tees 116, 118 extending from the primary loop portion 110. Persons having ordinary skill in the art should appreciate that the closely spaced tees 116, 118 provide hydraulic separation in the primary loop portion 110 between the first purge/fill valve portion 112 and the second purge/fill valve portion 114. A main valve portion 120 is disposed in the primary loop portion 110 in alignment with one of the closely spaced tees 116.

A main actuator 122 extends from the valve body 100 enabling a first and second position of the main valve portion 120. A main flow diversion device (not shown here) is connected to a main handle 124 via the main actuator 122. The main handle 124 is retained to the main actuator with a nut 126. A first purge/fill valve handle 128 is connected to a first purge/fill valve flow diversion device (not shown here) via a first purge/fill valve actuator (not shown here). The first purge/fill valve handle 128 is retained to the purge/fill valve actuator by a screw 130. A second purge/fill valve handle 132 is connected to a second purge/fill valve flow diversion device (not shown here) via a second purge/fill valve actuator (not shown here). The second purge/fill valve handle 132 is retained to the second purge/fill valve actuator by a screw 134.

Figure 11:
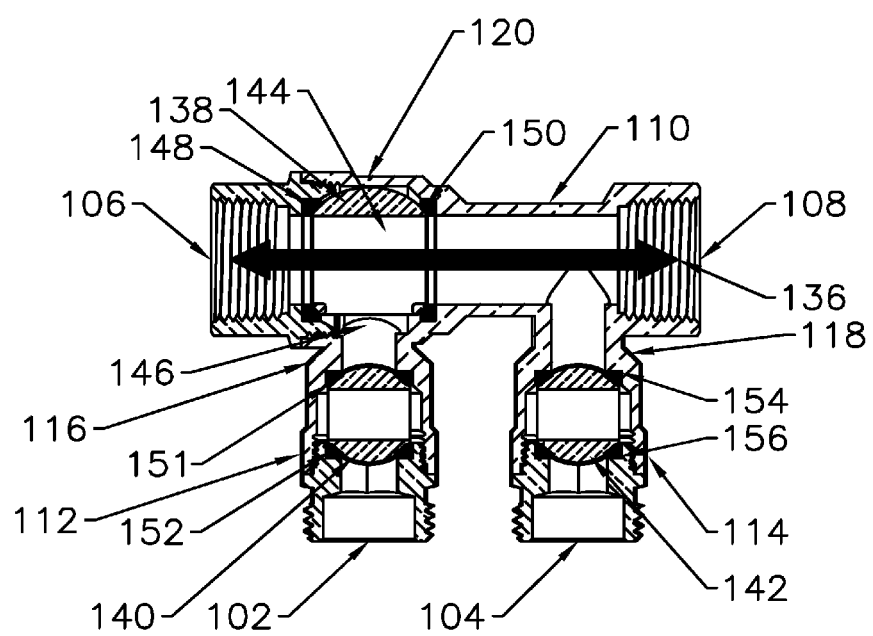
FIG. 11 is a section view of the primary/secondary loop purge valve in normal operating position according to the fifth illustrative embodiment of the invention.

FIG. 11 is a section view of the primary/secondary loop purge valve in normal operating position according to the fifth illustrative embodiment of the invention. A primary loop fluid flow path 136 is shown by arrows extending through the primary loop portion 110. In the configuration shown in FIG. 11, fluid can flow in either direction along the primary loop fluid flow path 136.

The main valve portion 120 is shown in the normal operation position in which fluid in the primary fluid flow path 136 can flow between the first primary loop port 106 and the second primary loop port 108 via the main valve portion 120. The main flow diversion device 138 in the main valve portion 120 is shown in a first position to enable flow in the primary flow path. The first purge/drain flow diversion device 140 and second purge/drain flow diversion device 142 are shown in a first position to prevent flow from the primary flow path to either the first purge/drain port 102 or the second purge/drain port 104. In this illustrative embodiment, the main flow diversion device 138 is a first ball having a through hole 144 extending through its center and a blind hole 146 extending orthogonal to the through hole to its center. The first ball is rotatable on an axis of the main actuator 122 (FIG. 10) by movement of handle 124 and main actuator 122 (FIG. 10). The first ball forms a seal with sealing portions 148 and 150.

The first purge/fill valve flow diversion device 140 in the first purge/fill valve portion 112 is shown in its normally closed position in which fluid in the primary flow path 136 is prevented from flowing between the main valve portion 120 and the first purge/fill port 102. In this illustrative embodiment, the first purge/fill valve flow diversion device 140 is a second ball having a through hole extending through its center. The second ball is rotatable on an axis of the first purge/fill valve actuator (not shown) which extends through its center and normal to the plane of drawing in FIG. 11 by movement of first purge/fill valve handle 128 (FIG. 10) and the first purge valve actuator retained thereto (not shown) by screw 130 (FIG. 10). The second ball forms a seal with sealing portions 151 and 152.

The second purge/fill valve flow diversion device 142 in the second purge/fill valve portion 114 is shown in its normally closed position in which fluid in the primary flow path 136 is prevented from flowing between the primary loop portion 110 and the second purge/fill port 104. In this illustrative embodiment, the second purge/fill valve flow diversion device 142 is a third ball having a through hole extending through its center. The third ball is rotatable on an axis of the second purge/fill valve actuator (not shown) which extends through its center and normal to the plane of drawing in FIG. 11 by movement of second purge/fill valve handle 132 (FIG. 10) and the first purge valve actuator retained thereto (not shown) by screw 134 (FIG. 10). The second ball forms a seal with sealing portions 154 and 156.

Figure 12:
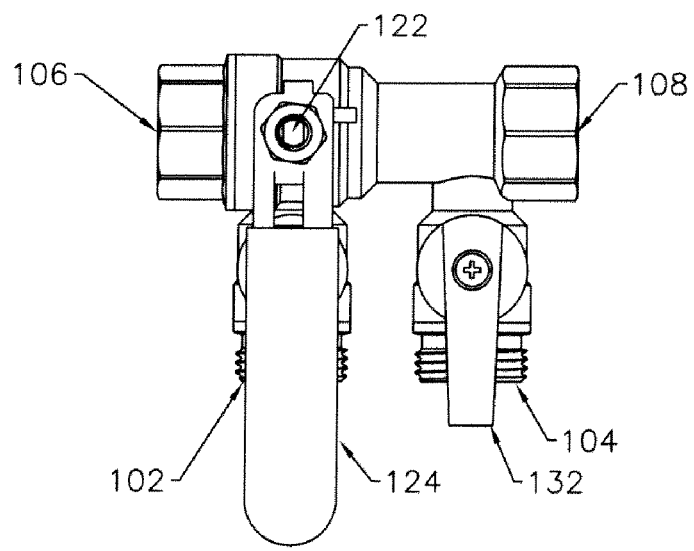
FIG. 12 is a plan view of the primary/secondary loop purge valve in a purging position according to the fifth illustrative embodiment of the invention.

FIG. 12 is a plan view of the primary/secondary loop purge valve in a purging position according to the fifth illustrative embodiment of the invention. The main valve handle 124 and main actuator 122 are rotated 90 degrees counter clockwise relative to their normal operating position. The first purge/fill valve handle 128 is rotated 90 degrees clockwise relative to its normally closed position and is obscured in this view by the main valve handle 124. The second purge/fill valve handle 132 is rotated 90 degrees counter-clockwise relative to its normally closed position.

Figure 13:
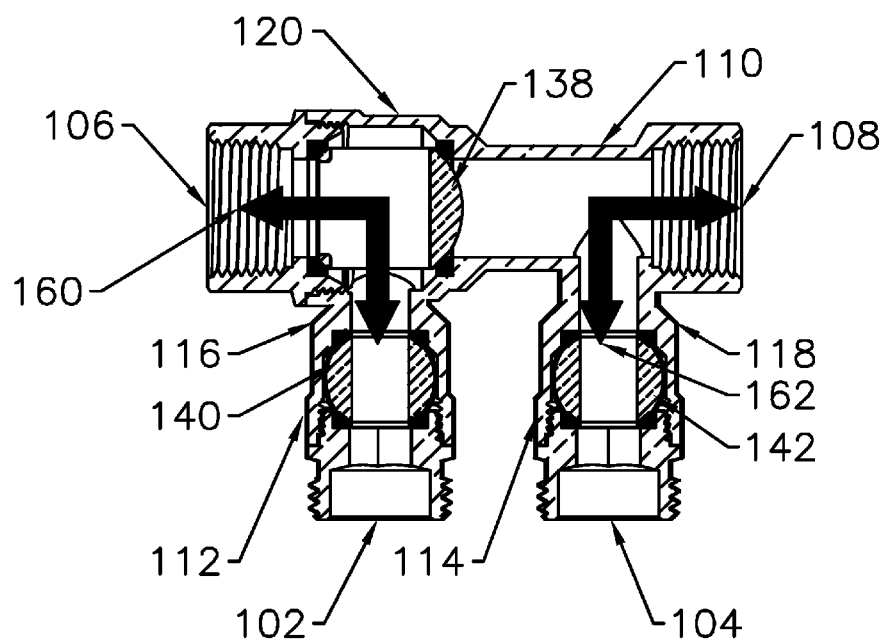
FIG. 13 is a section view of the primary/secondary loop purge valve in purging position according to the fifth illustrative embodiment of the invention.

FIG. 13 is a section view of the primary/secondary loop purge valve in purging position according to the fifth illustrative embodiment of the invention. A first purge/fill loop flow path 160 is shown by arrows extending between primary loop port 106 and tee 116. Fluid in the first purge/fill loop flow path 160 can flow through main valve portion 120 where it is diverted by the main flow diversion device 138 into the first purge/fill valve portion 112. Because the first purge/fill valve handle 128 (best seen in FIG. 10) is in the purge/fill position, fluid entering the first purge/fill valve portion 112 can flow through the first purge/fill flow diversion device 140 to the first purge/fill port 102.

A second purge/fill loop flow path 162 is shown by arrows extending between primary loop port 108 and tee 118. Fluid in the second purge/fill loop flow path 162 can not flow through main valve portion 120 because it is diverted by the main flow diversion device 138. Because the second purge/fill valve handle 132 (best seen in FIG. 12) is in the purge/fill position, fluid entering the second purge/fill valve portion 114 from primary loop port 108 can flow through the second purge/fill flow diversion device 142 to the second purge/fill port 104.

Figure 14:
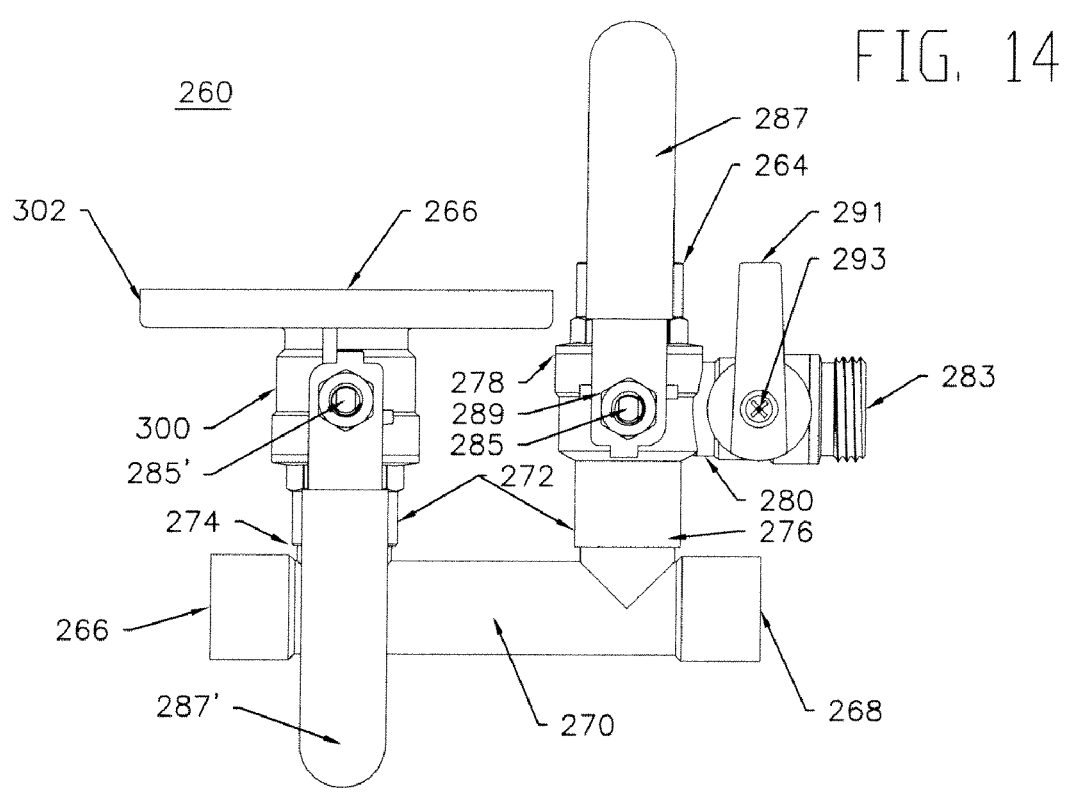
FIG. 14 is a plan view of a primary/secondary loop adapter in normal operating position according to a sixth illustrative embodiment of the invention.

FIG. 14 is a plan view of a primary/secondary loop adapter in normal operating position according to a sixth illustrative embodiment of the invention. The embodiment includes a valve body 260 containing a first primary loop port 262, a second primary loop port 264, a first secondary loop port 266 and a second secondary loop port 268. The secondary loop ports 266, 268 are disposed at respective ends of a linear secondary loop portion 270 of the valve body 260. A primary loop portion 272 of the valve body 260 is formed by a pair of "closely" spaced tees 274, 276 extending from the secondary loop portion 270. A first main valve portion 278 is disposed in a first one of the tees 276 between the secondary loop portion 270 and a primary loop port 264. A second main valve portion 300 is disposed in a second one of the tees 274 between the secondary loop portion 270 and primary loop port 262. In this illustrative embodiment, the primary loop port 262 includes a flange 302 which may be adapted for connecting directly to an apparatus in the primary loop, such as a pump, for example. The flange 302 may be implemented as a multi-piece rotatable flange such as disclosed in co-pending, commonly owned U.S. patent application Ser. No. 12/749,020 entitled, Rotatable Flange Apparatus and Method which is hereby incorporated by reference in its entirety.

A drain/venting valve portion 280 may extend from one or both main valve portions 278, 300. In the embodiment shown in FIG. 14 only one main valve portion 278 has a drain/venting valve portion 280 extending therefrom. Drain/venting valve portion 280 extends from the main valve portion 278. An end cap (not shown) may be affixed to the valve body 260 at a drain port 283 of the drain/venting valve portion 280. It should be understood that a similar drain/venting valve portion with or without an end cap could also extend from main valve portion 300 within the scope of the present disclosure.

A portion of the secondary loop portion 270 between the tees 274, 276 is shared with the primary loop portion in which flow in a primary loop and a secondary loop are "hydraulically separated."

A main actuator 285 extends from the valve body 260 enabling a first and second position of the main valve portion 278. A main flow diversion device (not shown here) is connected to a main handle 287 via the main actuator 285. The main handle 287 is retained to the main actuator with a nut 289. A purge valve handle 291 is connected to a purge valve flow diversion device (not shown here) via a purge valve actuator (not shown here). The purge valve handle 291 is retained to the purge valve actuator by a screw 293.

Figure 15:
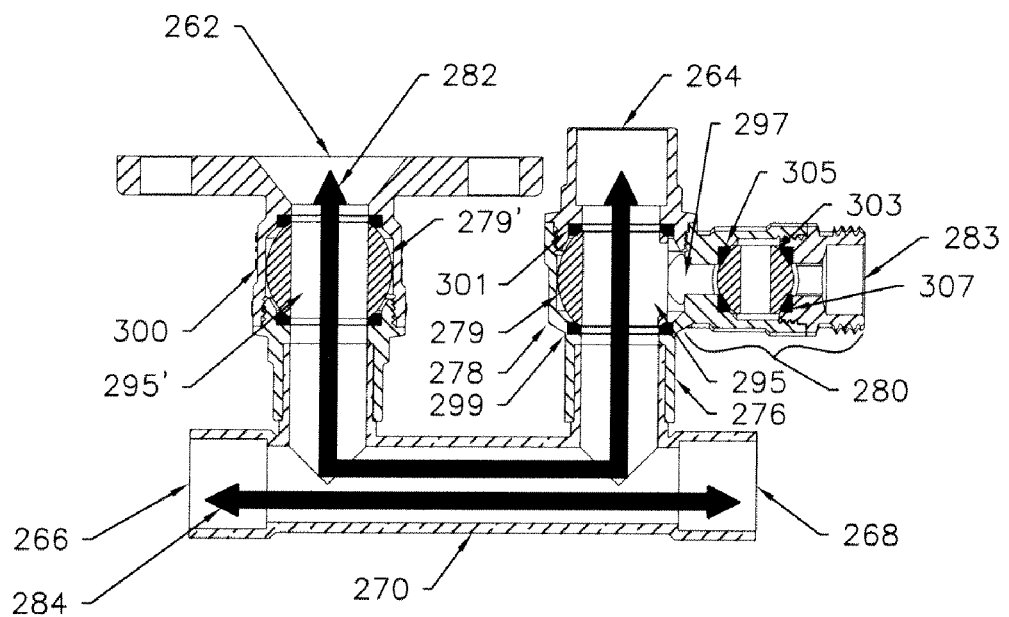
FIG. 15 is a section view of the primary/secondary loop adapter in normal operating position according to the sixth illustrative embodiment of the invention.

FIG. 15 is a sectioned view of the primary/secondary loop adapter in normal operating position according to a sixth illustrative embodiment of the invention. A primary loop fluid flow path 282 is shown by arrows extending into tee 274, through the secondary loop portion 270 and into tee 276. Fluid can flow in either direction along the primary loop fluid flow path 282. A secondary loop flow path 284 is shown by arrows extending into the first secondary loop port 266 through the secondary loop portion 270 and out from the second secondary loop port 268. It should be understood that a common flow of both the primary loop flow path 282 and the secondary loop flow path 284 exists in the secondary loop portion 270.

The first main valve portion 278 is shown in the normal operation position in which fluid in the primary fluid flow path 282 can flow from secondary loop portion 270 through the first main valve portion 278 to the primary loop port 264. The second main valve portion 300 is also shown in the normal operation position in which fluid in the primary fluid flow path 282 can flow from secondary loop portion 270 through the second main valve portion 300 to the primary loop port 262.

The main flow diversion devices 279, 279' in the main valve portion 278, 300 are shown in a first position to enable flow in the primary flow path between tees 274, 276 and the primary loop ports 262, 264 while preventing flow to the drain/venting valve portion 280. In this illustrative embodiment, the main flow diversion devices 279, 279' are balls having a through hole 295, 295' extending through their center. In embodiments in which a drain/venting valve portion 280 is extended from a main valve portion as shown extending from the first main valve portion 278, the ball includes a blind hole 297, extending orthogonal to the through hole to its center. The ball is rotatable on an axis of the main actuator 285, by movement of handles 287, 287' and main actuators 285, 285' (best seen in FIG. 14). The ball forms a seal with sealing portions 299 and 301.

The purge valve flow diversion device 303 in the drain/venting valve portion 280 is shown in its normally closed position in which fluid in the primary flow path 282 is prevented from flowing between the main valve portion 278 and the drain port 283. In this illustrative embodiment, the purge valve flow diversion device 303 is a second ball having a through hole extending through its center. The second ball is rotatable, on an axis of the purge valve actuator (not shown) which extends substantially through its center and normal to the plane of drawing in FIG. 15, by movement of purge valve handle 291 and the purge valve actuator retained thereto by a screw 293 (best seen in FIG. 14). The second ball forms a seal with sealing portions 305 and 307.

Figure 16:
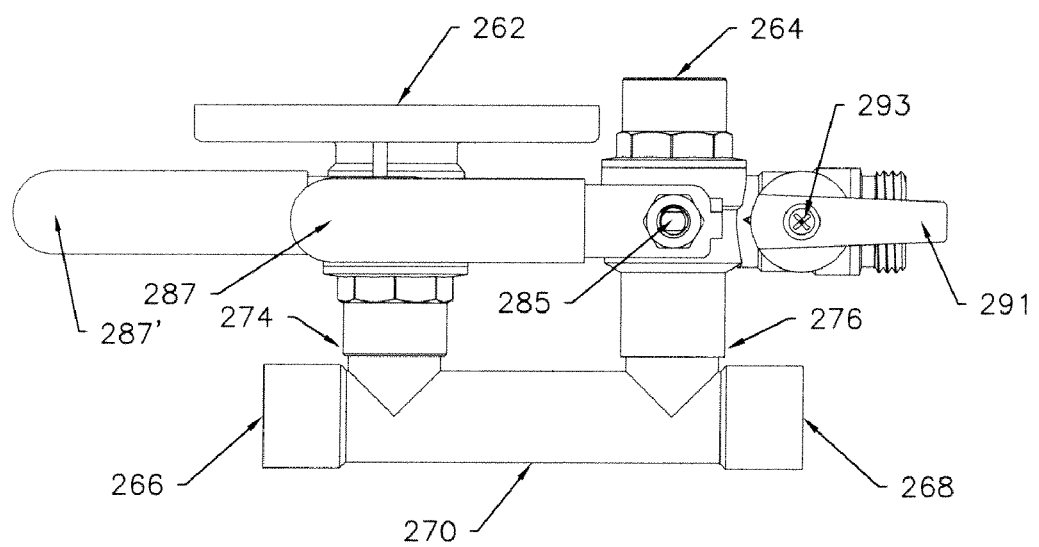
FIG. 16 is a plan view of the primary/secondary loop adapter in a purging position according to the sixth illustrative embodiment of the invention.

FIG. 16 is a plan view of the primary/secondary loop adapter in a purge/drain position according to the sixth illustrative embodiment of the invention. The main valve handles 287, 287' and main actuators 285 (second main actuator not shown) are rotated 90 degrees counter clockwise relative to their normal operating position. The purge valve handle 291 is rotated 90 degrees clockwise relative to its normally closed position. It should be appreciated that the actuators could be configured for rotation in the opposite directions.

Figure 17:
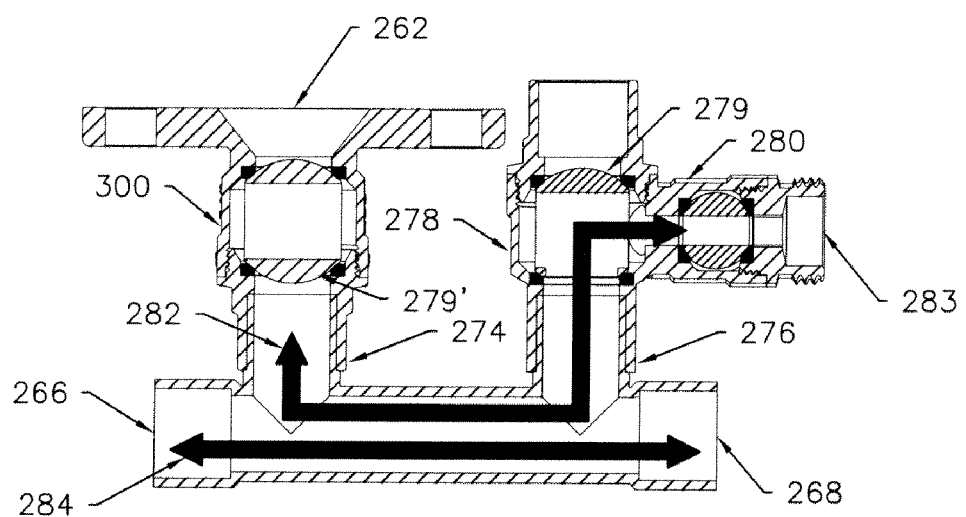
FIG. 17 is a section view of the primary/secondary loop adapter in a first purging position according to the sixth illustrative embodiment of the invention.

FIG. 17 is a sectioned view of the primary/secondary loop adapter in a first purge/drain position according to the sixth illustrative embodiment of the invention. The primary loop fluid flow path 282 is shown by arrows extending into tee 274, through the secondary loop portion 270 and into tee 276. Fluid in the primary flow path flows into first main valve portion 278 where it is diverted by the first main flow diversion device 279 into the drain/venting valve portion 280. Because the purge valve handle is in the first purge/drain position, fluid entering the drain/venting valve portion 280 from tee 276 can flow through the purge valve flow diversion device 303 to the drain port 283. A protective cap (not shown) can be removed to vent or drain the system via the primary flow path 282. Fluid in the primary flow path 282 that is directed into the second main valve portion 300 is blocked by the second main flow diversion device 279'.

Figure 18:
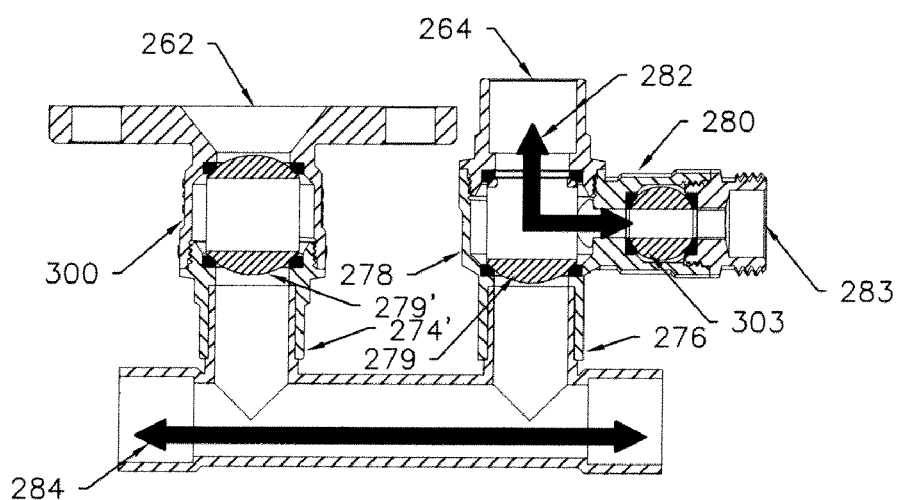
FIG. 18 is a section view of the primary/secondary loop adapter in a second purging position according to the sixth illustrative embodiment of the invention.

FIG. 18 is a sectioned view of the primary/secondary loop adapter in a second purge/drain position according to the sixth illustrative embodiment of the invention. The primary loop fluid flow path 282 is shown by arrows extending through the primary loop port 264 into the first main valve portion 278. Fluid in the primary flow path flows into first main valve portion 278 where it is diverted by the first main flow diversion device 279 into the drain/venting valve portion 280. Because the purge valve handle is in the second purge/drain position, fluid entering the drain/venting valve portion 280 from primary loop port 264 can flow through the purge valve flow diversion device 303 to the drain port 283. Fluid in the secondary flow path 284 that is directed into the second main valve portion 300 is blocked by the second main flow diversion device 279'. Fluid in the secondary flow path 284 that is directed into the first main valve portion 278 is blocked by the first main flow diversion device 279.

Persons having ordinary skill in the art should appreciate, with reference to FIGS. 15-18, that the second main flow diversion device 279' can be rotated to any one of three separate flow positions by rotation of the actuator 285 through about 180 degrees. That is, in the illustrative embodiment, the main flow diversion device operates as a 3-way valve. In the various illustrative embodiments of the invention, either or both of the main flow diversion devices 279, 279' can be so configured to operate as three way valves.

Figure 19:
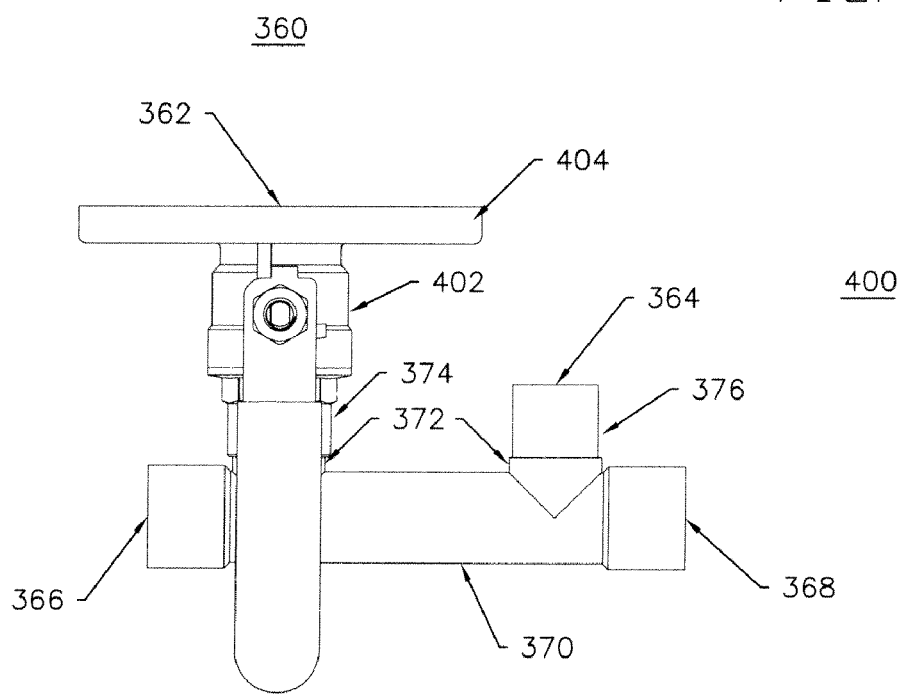
FIG. 19 is a plan view of a primary/secondary loop adapter in normal operating position according to a seventh illustrative embodiment of the invention.

FIG. 19 is a plan view of a primary/secondary loop adapter 400 in normal operating position according to a seventh illustrative embodiment of the invention. The embodiment includes a valve body 360 containing a first primary loop port 362, a second primary loop port 364, a first secondary loop port 366 and a second secondary loop port 268. The secondary loop ports 366, 368 are disposed at respective ends of a linear secondary loop portion 370 of the valve body 360. A primary loop portion 372 of the valve body 360 is formed by a pair of "closely" spaced tees 374, 376 extending from the secondary loop portion 370. A main valve portion 402 is disposed in a first one of the tees 374 between the secondary loop portion 370 and a primary loop port 362. In this illustrative embodiment, the primary loop port 362 includes a flange 404 which may be adapted for connecting directly to an apparatus in the primary loop, such as a pump, for example.

Figure 20:
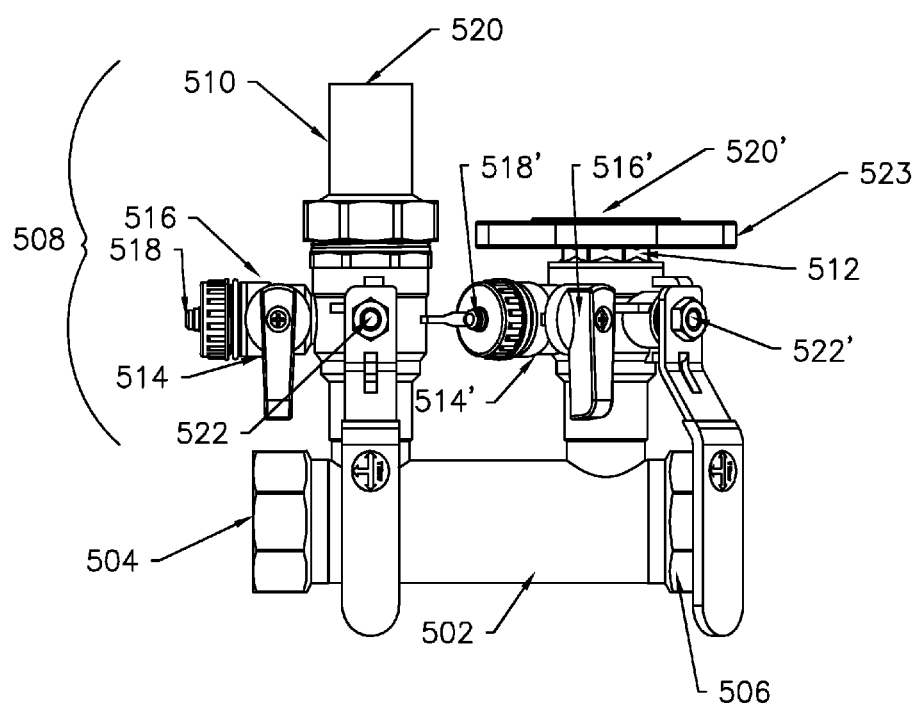
FIG. 20 is a plan view of a primary/secondary piping loop interface apparatus according to an eighth illustrative embodiment of the present invention.

FIG. 20 is a plan view of an eighth illustrative embodiment of the primary/secondary loop interface apparatus. The primary-secondary piping loop interface apparatus 500 includes a primary loop portion 502 including a tubular fluid conduit having a circumferential sidewall, a first end 504 and a second end 506 for interfacing with a primary loop in a plumbing system. A secondary loop portion 508 includes a first neck portion 510 and a second neck portion 512 extending from the circumferential sidewall. The first neck portion 510 and second neck portion 512 are substantially parallel to each other and substantially perpendicular to the primary loop portion 502 to form a pair of closely spaced tees suitable for hydraulic separation of fluid flow between the primary loop portion 502 and the secondary loop portion 508.

The secondary loop portion 508 further includes at least one drain valve portion 514, 514' extending from a corresponding neck portion 510, 512. The drain valve portion(s) 514, 514' include a respective drain shut-off valve 516, 516' disposed therein and a respective drain port 518, 518'. The respective drain shut-off valve(s) 516, 516' are arranged to enable or disable flow through the respective drain port(s) 518, 518'.

The secondary loop portion 508 also includes at least one secondary loop interface port 520, 520' terminating each respective neck portion 510, 512 and at least one secondary loop shut-off valve 522, 522' disposed in the corresponding neck portion 510, 512 between the respective secondary loop interface port 518, 518' and the circumferential sidewall of the primary loop portion 502.

In the eighth illustrative embodiment, the secondary loop shut-off valves 522, 522' includes an open operative position configured to open a main flow-path between the respective secondary loop interface port 520, 520' and the primary loop portion 502, and a closed operative position configured to close the main flow path between the respective secondary loop interface port 520, 520' and the primary loop portion 502. A drain flow path between the secondary loop interface port 520, 520' of the respective neck portion 510, 512 and the respective drain valve portion 514, 514' is configured to be open in both the open operative position and the closed operative position of the secondary loop shut-off valves 522, 522'.

In the illustrative embodiment, a rotatable flange 523 such as described in commonly owned co-pending U.S. patent application Ser. No. 12/749,020, which is incorporated herein by reference in its entirety, is configured to secure at least one of the secondary loop interface ports 520, 520' to an arbitrarily rotated flange interface in the secondary loop of a primary/secondary loop plumbing system.

Figure 21:
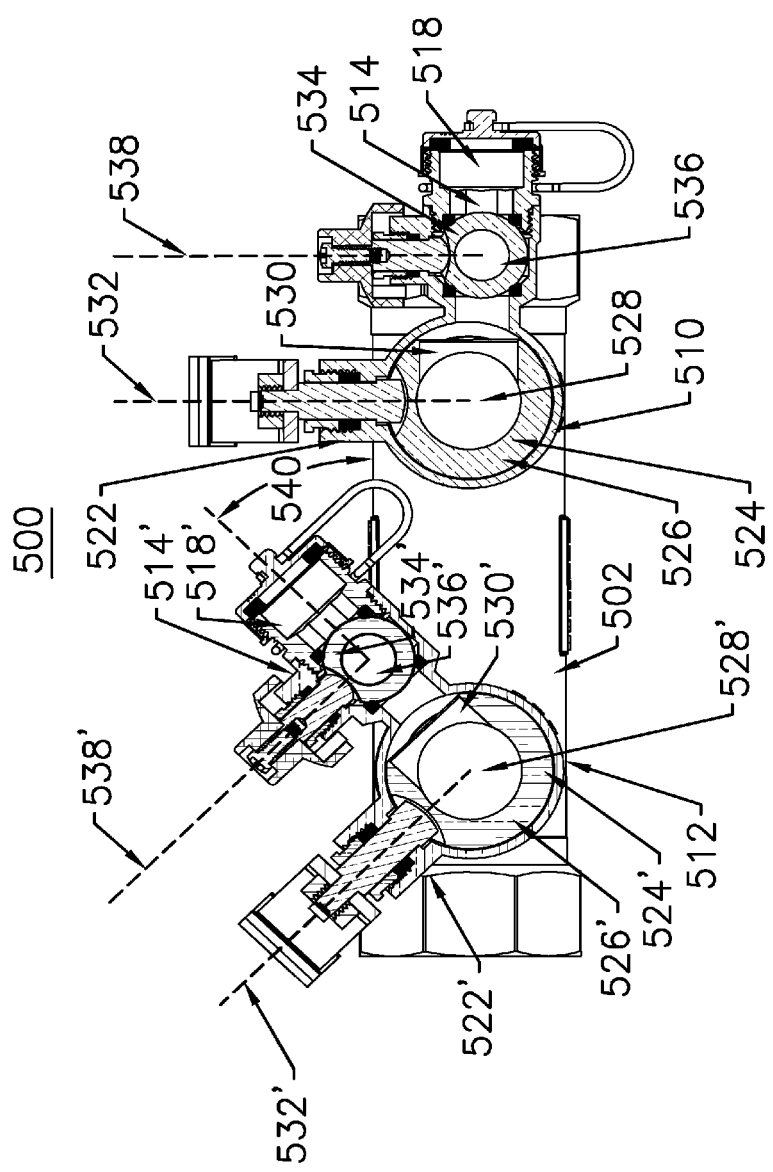
FIG. 21 is a top cross sectional view of the primary/secondary loop interface apparatus according to the eighth embodiment of the present invention.

FIG. 21 shows a top cross sectional view of the eighth illustrative embodiment wherein the section is taken through the secondary loop shut-off valves 522, 522' and the drain shut-off valves 516, 516'. The secondary loop shut-off valves 522, 522' each include a flow diversion device 524, 524' disposed in a junction between a respective neck portion 510, 512 and corresponding drain valve portion 514, 514'.

Each of the flow diversion devices 524, 524' include a main ball portion 526, 526' having a through hole 528, 528' extending centrally there-through and having a blind hole 530, 530' extending orthogonally to the through hole 528, 528' from the center of the respective main ball portion 526, 526'. The main ball portion 526, 526' is rotatable about a main ball axis 532, 532' through the center of the respective main ball portion 526, 526' and orthogonal to a plane of the respective through hole 528, 528' and blind hole 530, 530'. In the open operative position of a respective secondary loop shut-off valve 522, 522', the respective through hole 528, 528' is aligned with the corresponding secondary loop interface port 520, 520' (FIG. 20) and wherein in the closed operative position, the respective blind hole 530, 530' is aligned with the corresponding secondary loop interface port 520, 520' (FIG. 20).

Each of the drain shut-off valves 516, 516' includes a drain ball portion 534, 534' having a through hole 536, 536' extending centrally there-through and is rotatable through an arc of about 90 degrees about a drain ball axis 538, 538'. Each of the drain ball axes 538, 538' are perpendicular to the through hole 536, 536' of the drain ball portion and parallel to the corresponding main ball axis 532, 532'.

In the illustrative embodiment, a first drain valve portion 514 is parallel to the primary loop portion 502 and directed away from the second neck portion 512, and the second drain valve portion 514' is directed generally toward the first neck portion 510 and oriented at an angle 540 of about 45 degrees relative to the primary loop portion 502 in this illustrative embodiment. An angle of 0 to 90 degrees or preferably 15-75 degrees may be implemented to provide clearance around the first neck portion 510 for access to the drain valve port 518' of the second drain valve portion 514'.

An implementation of the primary/secondary loop interface apparatus according to the eighth embodiment of the invention in a primary/secondary loop piping system is described with reference to FIG. 22. The primary-secondary loop piping system includes at least one boiler 602 in fluid communication with a primary piping loop 604. At least one primary loop pump 606 is installed in the primary piping loop 604. At least one secondary piping loop 608, 608', 608" branches away from the primary loop 604 and returns downstream to the primary loop 608 via a pair of closely spaced tees in a primary-secondary piping loop interface apparatus 500.

Figure 22:
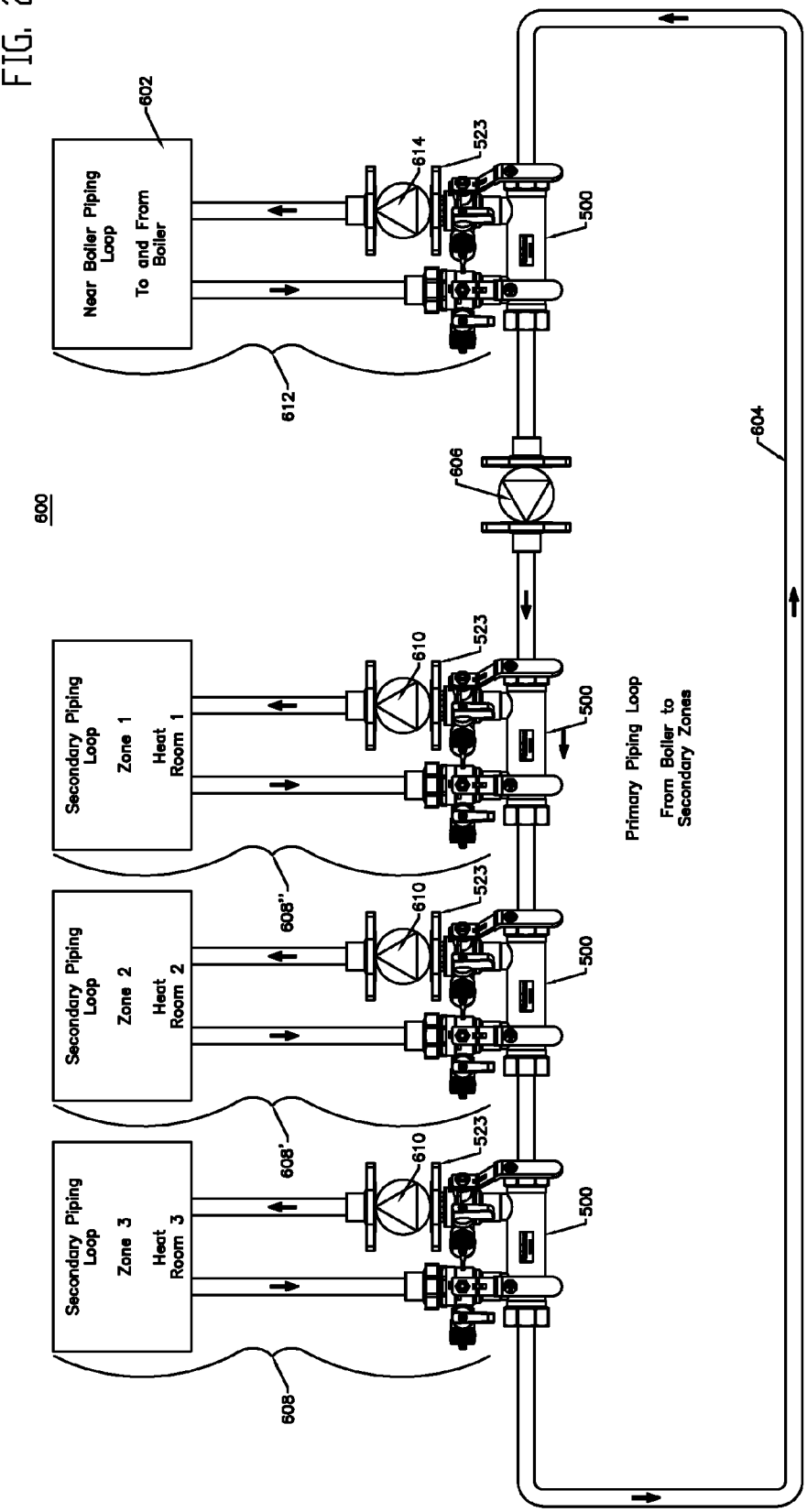
FIG. 22 is a schematic system diagram of a primary/secondary loop piping system including a primary/secondary loop interface apparatus according to an illustrative embodiment of the invention.

In the primary/secondary loop piping system shown in FIG. 22, each of the primary-secondary piping loop interfaces 500 are substantially identical to those described hereinbefore with reference to FIGS. 20 and 21.

At least one secondary loop pump 610 is installed in each of the secondary piping loops 608. In each secondary loop 608, the secondary loop pump 610 is mounted to a flange 523 on one of the secondary loop interface ports (520' FIG. 20). In the illustrative embodiment the flange 523 is a rotatable flange as described in the referenced U.S. patent application Ser. No. 12/749,020. However, it should be understood that various alternative embodiments could be configured wherein flange 523 is a fixed flange within the scope of the present disclosure. The rotatable flange 523 is configurable to secure a secondary loop interface port (520' FIG. 20) to an arbitrarily rotated flange interface in the secondary loop 608, such as a mating flange on the secondary loop pump 610. The rotatable flange allows the secondary loop pump 610 or other component having a flange interface to be connected to the primary/secondary loop interface apparatus 500 over a range of relative angular displacements between the secondary loop pump 610 and the primary/secondary loop interface apparatus 500. This is beneficial where mounting a pump in a particular fixed angular displacement could be difficult or impossible due to space constraints, for example, or other zone loop.

In the illustrative embodiment, the primary/secondary piping loop system includes a plurality of secondary piping loops 608 wherein one or more of the secondary piping loops 608 each constitute a separate heating zone, for example. Another of secondary piping loops 608 could constitute a snow melt system, for example.

In the illustrative embodiment the boiler 602 is also installed in a secondary loop referred to herein as a near boiler piping loop 612. A secondary loop pump 614 in the near boiler piping loop 612 can be installed to the primary-secondary piping loop interfaces 500 in the same manner as described with regard to the secondary loop pumps 610 in secondary loops 608. Alternative embodiments of a near boiler piping loop 612 may include a secondary loop pump which is incorporated internally within the boiler rather than external to the boiler 602 as shown in FIG. 22. In these alternative embodiments, the flange 523 on the primary-secondary piping loop interfaces 500 may be replaced by a union fitting for connecting to piping in the near boiler piping loop 612.

Illustratively, the primary loop pump 606 is installed in the primary loop 604 between the near boiler piping loop 612 and the other secondary loops 608 wherein energy from the boiler is distributed. It should be understood that alternative embodiments within the scope of the present disclosure could include a boiler installed in the primary loop, rather than in a secondary loop as shown in FIG. 22. Such embodiments may include a pump incorporated internally with the boiler rather than a separately installed primary loop 606 as shown in FIG. 22.

In another implementation, the primary-secondary piping loop interface apparatus 500 according to the eighth embodiment of the invention is included in a near boiler piping apparatus which is described with reference to FIG. 23. The near boiler piping apparatus 700, includes a primary-secondary loop interface apparatus 500 which was described hereinbefore with reference to FIGS. 20 and 21 and a return branch pipe section 702 attached to the second secondary loop interface port (520 FIG. 20) of the primary-secondary loop interface apparatus 500.

In the illustrative embodiment, a first flange 523 is configured on the first secondary loop interface port (520' FIG. 20) to allow attachment of a first flange interface of a circulation pump 704 to the first secondary loop interface port (520' FIG. 20). In the illustrative embodiment the first flange 523 is a rotatable flange configured on the first secondary loop interface port (520' FIG. 20) to allow attachment of an arbitrarily rotated first flange interface of the circulation pump 704 to the first secondary loop interface port (520' FIG. 20).

The return branch pipe section 702 includes a return branch boiler attachment tee 706. The return branch boiler attachment tee 706 includes a return branch boiler attachment fitting 708 and a return branch auxiliary attachment point 710.

A second flange 712 is configured on wye strainer 714 which is attached to a supply branch pipe section 716 for mounting the wye strainer 714 to a second flange interface of the circulation pump 704. In the illustrative embodiment, the second flange 712 is a rotatable flange configured on the wye strainer 714 to allow attachment of an arbitrarily rotated second flange interface of the circulation pump 704. A wye strainer 714 with a rotatable flange which is suitable for use in the near boiler piping apparatus 700 is described in Applicant's co-pending U.S. patent application entitled ROTATABLE FLANGE WYE STRAINER, attorney docket no. 55807.16-CIP, which is a Continuation-in-Part of U.S. patent application Ser. No. 12/749,020, filed on Mar. 29, 2010 which are incorporated herein by reference in their entirety.

The supply branch pipe section 716 includes a supply branch boiler attachment tee 718. In the illustrative embodiment, the supply branch boiler attachment tee 718 includes a supply branch boiler attachment fitting 720 and a supply branch auxiliary attachment point 722. The supply branch auxiliary attachment point 722 and return branch auxiliary attachment point 710 can be used for attaching an indirect water heater to the boiler, for example.

A union fitting 724 connects the return branch pipe section 702 to the second secondary loop interface port (520, FIG. 20). In the illustrative embodiment, the union fitting 724 includes a gauge hole configured for connecting a gauge 726 such as a pressure gauge or temperature gauge, for example, to the union fitting 724.

In the illustrative embodiment, the return branch pipe section includes a knee portion 728 configured to offset the return branch boiler attachment tee 706 from the supply branch boiler attachment tee 718.

Illustrative embodiments of the present invention also provide a method of servicing a secondary loop in a primary-secondary loop piping system by operating the primary-secondary piping loop interface apparatus described hereinbefore with reference to FIGS. 20 and 21. In an embodiment described with reference to FIG. 24, the method 800 of operating the primary-secondary piping loop interface apparatus includes the step of setting each of the at least one secondary loop shut-off valves (522, 522', FIG. 20) to their respective closed operative position 802.

In the illustrative embodiment, a draining operation of the primary-secondary loop interface apparatus requires the stop of draining a corresponding secondary loop of the primary-secondary loop piping system by opening the respective drain shut-off valves at least one of the drain valve portions.

In the illustrative embodiment, a filling operation of the primary-secondary loop piping interface includes the steps of filling a corresponding secondary loop of the primary-secondary loop piping system by connecting a fill hose to at least one of the drain ports of at least one of the drain valve portions 806 and opening the respective drain shut-off valve of the drain valve portion 808.

In the illustrative embodiment, a flushing operation of the primary-secondary loop piping interface includes the steps of flushing a corresponding secondary loop of the primary-secondary loop piping system by connecting a fill hose to at least one of the drain ports of at least one of the drain valve portions 810, opening the respective drain shut-off valve of the respective drain valve portion 812 and opening the drain shut-off valve in another of the at least one drain valve portions 814.

It should be appreciated that a "diversion device" can be one or more devices for diverting flow in a desired manner. The descriptions of flow paths and flow directions herein which identify flow paths or other elements with labels such as primary and secondary, or first and second are for illustrative purposes to provide labels for a particular embodiment, drawing or claim and are not indicative of a hierarchal relationship between the elements. Further it should be understood that such labels may be reversed in any of the embodiments described or claimed herein without affecting the scope of the present disclosure. Similarly, it should be understood that the clockwise or counterclockwise direction of rotations of certain elements such as flow diversion devices and handles described herein are for illustrative purposes only and may generally be reversed without changing the scope of the present disclosure.

While the invention has been described with reference to illustrative embodiments, it will be understood by those skilled in the art that various other changes, omissions and/or additions may be made and substantial equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A near boiler piping apparatus, comprising:
 a primary-secondary loop interface apparatus including,
 a primary loop portion including a tubular fluid conduit having a circumferential sidewall, a first end and a second end for interfacing with a primary loop in a plumbing system;
 a secondary loop portion including a first neck portion extending from the circumferential sidewall and a second neck portion extending from the circumferential sidewall, wherein the first neck portion and second neck portion are substantially parallel to each other and substantially perpendicular to the primary loop portion;
 the secondary loop portion further including a first drain valve portion extending from the first neck portion including a first drain shut-off valve disposed therein and a first drain port, and a second drain valve portion extending from the second neck portion including a second drain shut-off valve disposed therein and a second drain port, wherein the respective drain shut-off valves are arranged to enable or disable flow through the respective drain ports;
 the secondary loop portion further including a first secondary loop interface port terminating the first neck portion and a first secondary loop shut-off valve disposed in the first neck portion between the first secondary loop interface port and the circumferential sidewall;
 the secondary loop portion further including a second secondary loop interface port terminating the second neck portion and a second secondary loop shut-off valve disposed in the second neck portion between the second secondary loop interface port and the circumferential sidewall;
 each of the first secondary loop shut-off valve and second secondary loop shut-off valve includes an open operative position configured to open a main flow-path between the respective secondary loop interface port and the primary loop portion, and a closed operative position configured to close the main flow path between the respective secondary loop interface port and the primary loop portion;
 a flow diversion device in each of the first and second secondary loop shut-off valves is configured to form a drain flow path between the secondary loop interface port of each respective neck portion and each corresponding respective drain valve portion that is open in both the open operative position and the closed operative position of the secondary loop shut-off valves; and
 a first flange configured on and rotatable with respect to the first secondary loop interface port.

2. The near boiler piping apparatus of claim 1, further comprising a return branch pipe section attached to the second secondary loop interface port including a return branch boiler attachment tee, wherein the return branch boiler attachment tee includes a return branch boiler attachment fitting and a return branch auxiliary attachment point.

3. The near boiler piping apparatus of claim 1, wherein the first flange is configured to attach the first secondary loop interface port to an arbitrarily rotated first flange interface of a circulation pump.

4. The near boiler piping apparatus of claim 1, further comprising:
 a wye strainer;
 a second flange configured on the wye strainer for mounting the wye strainer to a second flange interface of a circulation pump; and
 a supply branch pipe section attached to the wye strainer.

5. The near boiler piping apparatus of claim 4, wherein the supply branch pipe section includes a supply branch boiler attachment tee, wherein the supply branch boiler attachment tee includes a supply branch boiler attachment fitting and a supply branch auxiliary attachment point.

6. The near boiler piping apparatus of claim 4, wherein the second flange is rotatable with respect to the wye strainer and configured to attach to an arbitrarily rotated second flange interface of the circulation pump.

7. The near boiler piping apparatus of claim 2, comprising:
 a union fitting connecting the return branch pipe section to the second secondary loop interface port, wherein the union fitting includes a gauge hole configured for connecting a pressure gauge to the union fitting.

8. The near boiler piping apparatus of claim 2, wherein the return branch pipe section includes a knee portion configured to offset the return branch boiler attachment tee from a supply branch boiler attachment tee.

9. The near boiler piping apparatus of claim 1, wherein the flow diversion device in each of the first and second secondary loop shut-off valves includes a through-hole and a blind-hole orthogonally disposed with respect to the through-hole.

* * * * *